US008284431B2

(12) United States Patent
Ohsone (10) Patent No.: US 8,284,431 B2
(45) Date of Patent: Oct. 9, 2012

(54) PRINTING MANAGEMENT SYSTEM, PRINTING MANAGEMENT METHOD, AND PROGRAM

(75) Inventor: Atsuo Ohsone, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 583 days.

(21) Appl. No.: 12/532,236

(22) PCT Filed: Dec. 5, 2008

(86) PCT No.: PCT/JP2008/072180
§ 371 (c)(1),
(2), (4) Date: Sep. 21, 2009

(87) PCT Pub. No.: WO2009/072620
PCT Pub. Date: Jun. 11, 2009

(65) Prior Publication Data
US 2010/0039663 A1  Feb. 18, 2010

(30) Foreign Application Priority Data
Dec. 7, 2007  (JP) .................................. 2007-317201

(51) Int. Cl.
*H04L 9/32* (2006.01)
*G06K 15/00* (2006.01)
(52) U.S. Cl. ...... 358/1.15; 358/1.9; 358/1.14; 358/1.13; 358/1.16; 358/1.18; 358/3.28; 382/100; 713/176; 713/179; 713/167
(58) Field of Classification Search ................ 358/1.1, 358/1.14, 1.15, 1.18, 3.28, 1.16; 380/28; 713/165, 176, 187, 179–181; 382/100
See application file for complete search history.

(56) References Cited

U.S. PATENT DOCUMENTS

| | | | | |
|---|---|---|---|---|
| 5,606,609 | A * | 2/1997 | Houser et al. ................. | 713/179 |
| 6,131,162 | A * | 10/2000 | Yoshiura et al. .............. | 713/176 |
| 6,278,791 | B1 * | 8/2001 | Honsinger et al. ............ | 382/100 |
| 7,051,207 | B2 * | 5/2006 | Watanabe ....................... | 713/176 |
| 7,110,541 | B1 | 9/2006 | Lunt et al. | |
| 7,146,502 | B2 * | 12/2006 | Hayashi ......................... | 713/176 |
| 7,424,131 | B2 * | 9/2008 | Alattar et al. .................. | 382/100 |
| 7,791,762 | B2 * | 9/2010 | Sato ............................... | 358/1.9 |
| 8,140,786 | B2 * | 3/2012 | Bunte et al. .................... | 711/161 |
| 8,190,901 | B2 * | 5/2012 | Barr et al. ....................... | 713/176 |
| 2006/0224896 | A1 * | 10/2006 | Takagi et al. .................. | 713/176 |
| 2006/0277410 | A1 * | 12/2006 | Jajodia et al. .................. | 713/176 |
| 2007/0223038 | A1 | 9/2007 | Sato | |
| 2008/0082827 | A1 * | 4/2008 | Agrawal et al. ............... | 713/176 |

FOREIGN PATENT DOCUMENTS

| | | |
|---|---|---|
| JP | 11-85787 A | 3/1999 |
| JP | 2004-112318 A | 4/2004 |
| JP | 2006-92066 A | 4/2006 |
| JP | 2006-115237 A | 4/2006 |
| JP | 2006-171830 A | 6/2006 |
| JP | 2006-252231 A | 9/2006 |
| JP | 2006-260136 A | 9/2006 |
| JP | 2007-94620 A | 4/2007 |
| JP | 2007-283759 A | 11/2007 |
| JP | 2007-299096 A | 11/2007 |
| WO | 2006/009663 A1 | 1/2006 |

* cited by examiner

*Primary Examiner* — Twyler Haskins
*Assistant Examiner* — Dennis Dicker
(74) *Attorney, Agent, or Firm* — Mattingly & Malur, PC (57) ABSTRACT

Insertion of a watermark corresponding to the content of a file at the time of the printing of the file is made possible. Importance and/or confidentiality is defined per keyword in advance, and the watermark to be inserted is defined based thereon. At the time of the printing of the file, a keyword search within the file is performed, and the watermark to be inserted is automatically selected based on the search result (see FIG. 5).

14 Claims, 8 Drawing Sheets

Keyword definition file 41

| Keyword | Watermark policy | Date and time of update | ... |
|---|---|---|---|
| Doe | 1001 | 1.11.2007 12:00 | ... |
| John Doe | 1002 | 2.11.2007 10:20 | ... |
| Internal use only | 3001 | 3.11.2007 15:30 | ... |

Watermark definition file 42

| Watermark policy | Watermark definition 1 | Watermark definition 2 | ... |
|---|---|---|---|
| 1001 | Name of person printing, date and time | Single, bottom left, horizontal | ... |
| 1002 | Name of person printing, date and time, and name of machine | Succsesive, 30° | ... |
| 3001 | Internal use only | Single, center, 45° | ... |

Hash policy file 43

| Hash | Watermark policy | Policy determination date | ... |
|---|---|---|---|
| xxxxxxxxxxxx | 5001 | 1.9.2007 | ... |

Keyword list 44

| Keyword | Category | Date and time of update | ... |
|---|---|---|---|
| John Doe | Personal information | 4.10.2007 9:30 | ... |
| ABC corporation | Trade secret | 5.10.2007 9:50 | ... |
| Internal use only | Specific text string | 6.10.2007 8:40 | ... |

File hash list 45

| Hash | ... |
|---|---|

PRINTING MANAGEMENT SYSTEM, PRINTING MANAGEMENT METHOD, AND PROGRAM

TECHNICAL FIELD

The present invention relates to a printing management system, as well as a printing management method and program, for inserting a watermark into a file at the time of printing of the file.

BACKGROUND ART

With the implementation of the Personal Information Protection Act in 2005, information leakage countermeasures have become an important issue for organizations such as corporations and the like. One of the things that require information leakage countermeasures in organizations such as corporations includes printed material printed on paper media. As an information leakage countering method relating to printed material, there is proposed, as in Patent Document 1, for example, a system that seeks to prevent information leakage by mandatorily inserting a background watermark with respect to printed material upon printing, thereby making responsibility over the printed material clearer to the person making the print, and raising caution about the handling of the printed material.

Patent Document 1: Japanese Patent Publication (Kokai) No. 2007-94620 A

Patent Document 2: Japanese Patent Publication (Kokai) No. 2006-115237 A

DISCLOSURE OF THE INVENTION

Problem to be Solved by the Invention

However, in Patent Document 1, the presence/absence of watermark insertion with respect to print material is defined per user or group. As a result, even if a plurality of users were to print the same material, a watermark may or may not be inserted depending on the user. In addition, the kind of watermark to be inserted is also defined per user or group. As a result, as long as it is the same user, the same watermark would be inserted into the printed material whatever the user prints, regardless of the level of importance of the printed material. In other words, a watermark would be indiscriminately inserted with respect to print material into which a watermark should be inserted as an information leakage countermeasure as well as with respect to print material that need not be watermarked. This would result in the same watermark being inserted regardless of the level of importance (level of confidentiality), thereby obscuring the caution being raised with respect to the user regarding the handling of the printed material. In addition, it compromises the appearance of printed material for which a watermark is unnecessary.

In contrast therewith, in Patent Document 2, there is proposed a method in which the presence/absence of watermark insertion as well as the kind of watermark to be inserted are defined in accordance with, in addition to user information, the storage location of a file within the memory using the name (path) of the file that is to be printed. Thus, it is made possible to define the watermark to be inserted in accordance with the file in addition to user information.

However, when, as in Patent Document 2, a method is used where the kind of watermark to be inserted is defined by file name (path), there is a need to first take inventory of all files existing within an organization, determine the importance and/or confidentiality thereof, and register their file names (paths) on a system, despite the fact that vast numbers of files are handled in organizations such as corporations. Although Patent Document 2 makes no mention as to the registration method thereof, assuming the registration operation is to be performed by people, such an operation would probably require an enormous amount of time and effort, and would probably not be complete. In addition, even if all files were registered, if file names were to be changed, contents of files changed, or files newly created, it would be necessary to update and/or add to the registered information. Based on these points, with respect to a method that determines the kind of watermark to be inserted based on file names (paths), it is believed that a flexible operation cannot be performed, and that continuing to register and/or update the definitions of files that are subject to watermark insertion would be difficult.

The present invention is made in view of such circumstances, and provides a method that makes it possible to readily and appropriately execute the insertion of a watermark in accordance with the content (level of confidentiality, level of importance) of a file at the time of printing of the file.

Means for Solving the Problem (1) In order to solve the problem above, in the present invention, first, a file to be printed is specified from a file storage unit storing files, and keyword search means refers to a keyword list to search for a keyword included in the file to be printed. Here, the keyword list stores keywords, which are such keywords that, if included in the file to be printed, signify that watermark information is to be inserted into the file to be printed. In addition, watermark information acquisition means refers to watermark information storage means (watermark definition file, keyword definition file) storing keywords and watermark information in association, compares the found keyword with keywords stored in the watermark information storage means, and acquires the watermark information corresponding to the found keyword. In addition, printing is performed with the acquired watermark information inserted into the file to be printed. The watermark information storage means includes a keyword definition file that stores watermark policies, which indicate the level of importance of keywords, and keywords in association, and a watermark definition file that stores the watermark policies and watermark information in association. As for details of the watermark information acquisition operation, the watermark information acquisition means acquires the watermark policy corresponding to the found keyword, and acquires the watermark information corresponding to the acquired watermark policy.

Further, hash calculation means calculates a hash of the file to be printed. File information registration means acquires from the keyword definition file the watermark policy corresponding to the found keyword, associates the acquired watermark policy with the calculated hash, and registers them in a hash policy file.

In addition, when a file stored in file storage means is updated, or when a file is newly added, the hash calculation means calculates a hash of the updated file or the added file to acquire a new hash. In addition, the keyword search means searches for a keyword included in the updated file or the added file as a link keyword (the keyword obtained as a search result of step S605, FIG. 6). The file information registration means acquires from the keyword definition file the watermark policy corresponding to the link keyword, associates the acquired watermark policy with the new hash, and registers them in the hash policy file.

Further, when a keyword of the watermark information storage means is updated, keyword updating means reflects the content of this update in keyword storage means.

(2) In the present invention, the hash calculation means calculates a hash of the file to be printed. The watermark information acquisition means refers to the watermark information storage means (the hash policy file, the watermark definition file), which stores a hash of a file and watermark information in association, compares the calculated hash with the hashes stored in the watermark information storage means, and acquires the watermark information corresponding to the calculated hash. In addition, printing is performed with the acquired watermark information inserted into the file to be printed.

Further, the keyword search means refers to the keyword storage means, and searches for keywords included in the file to be printed. Here, the keyword storage means stores keywords, which are such keywords that, if included in the file to be printed, signify that watermark information is to be inserted into the file to be printed. In so doing, the watermark information storage means (keyword definition file) further has stored therein the keywords stored in the keyword storage means and watermark information in association. In addition, in the event that watermark information corresponding to the calculated hash could not be acquired, the watermark information acquisition means compares the found keyword with the keywords stored in the watermark information storage means, and acquires the watermark information corresponding to the found keyword.

Further features of the present invention will become apparent through the best mode for carrying out the present invention below, as well as the appended drawings.

Effect of the Invention

According to the present invention, there can be realized a watermark printing management system that is capable of automatically performing the registering and/or updating of files into which a watermark is to be inserted, while switching between kinds of watermarks to be inserted in accordance with the content (level of importance, level of confidentiality) of the print material.

BEST MODE FOR CARRYING OUT THE INVENTION

The present invention relates to a watermark printing management system and method that make responsibility over printed material clear to the person that made the print and raise caution about the handling of printed material by embedding a background watermark into printed material, and thus prevent information leakage due to loss and/or theft, careless copying, and the like of printed material. In addition, in the event that information leakage occurs by way of printed material, it is made possible to find out the leakage channel from the watermark embedded in the printed material.

An embodiment of the present invention is described below with reference to the appended drawings. However, it is to be noted that the present embodiment is merely an example for realizing the present invention and by no means limits the technical scope of the present invention. In addition, in the figures, like reference numbers are assigned to like structures.

<Configuration of Watermark Printing Management System>

Figure 1:
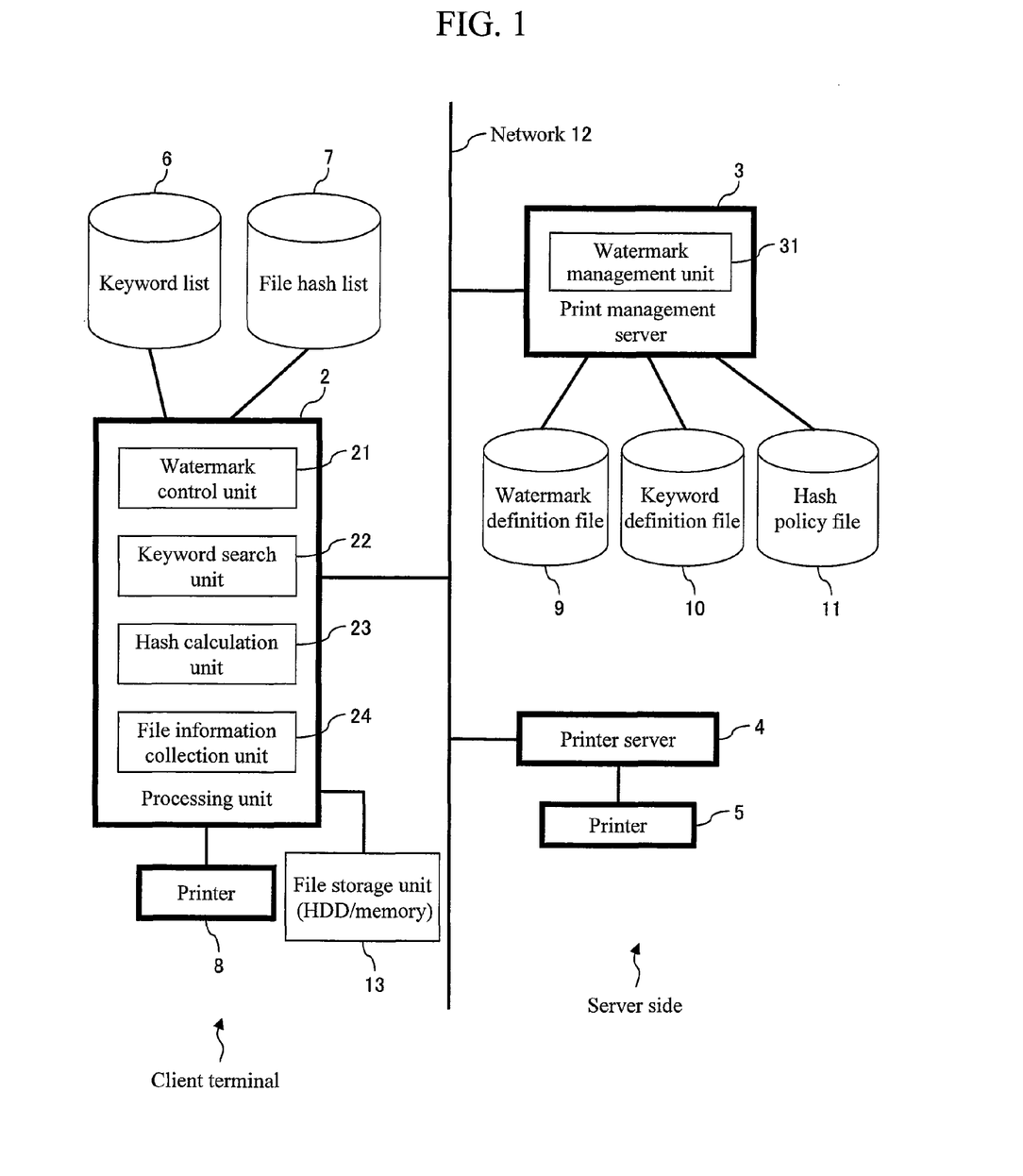
[FIG. 1] is a diagram showing a schematic configuration of a watermark printing management system according to an embodiment of the present invention.

FIG. 1 is a diagram showing a schematic configuration of a watermark printing management system according to an embodiment of the present invention. This watermark printing management system comprises a client terminal on which a print operation is performed by a user, a print management server 3 that manages the insertion of a watermark into printed material, and a printer server 4 to which a printer 5 is connected, and they are connected via a network 12. Respective processing units in FIG. 1 may be realized by means of, for example, software programs, in which case operations of the respective processing units are controlled by control units (for example, CPUs and MPUs), not shown in the figure, at the client and the print management server.

In FIG. 1, the client terminal comprises: a processing unit 2 that executes various processes for watermark insertion; a keyword list DB (database) 6 in which are stored keywords used in searching for a keyword within a file; a file hash list DB 7 in which are stored hashes of files within a client; a printer 8; and a file storage unit 13 that stores at least one file that runs through a predetermined application. Keywords included in the keyword list DB 6 may include, for example, personal information such as names and/or addresses (or parts thereof) of personnel within an organization, trade secrets such as client names, project names, etc., specific text strings such as "Internal Use Only", "(Confidential)" etc., and the like.

In addition, the processing unit 2 comprises: a watermark control unit 21; a keyword search unit 22; a hash calculation unit 23; and a file information collection unit 24. Details of each processing unit will be described later.

On the other hand, the print management server 3 comprises a watermark management unit 31. In addition, the print management server 3 comprises: a watermark definition file DB 9 in which are stored definitions as to what kind of watermark is to be inserted with respect to print material; a keyword definition file DB 10 in which are stored keywords that are defined as being important and/or confidential in an organization; and a hash policy file DB 11 in which is stored information on files within clients.

FIG. 1 shows, with respect to the present invention, an example in which the printer 8 is directly connected to the processing unit 2 of the client terminal, and the printer 5 is connected via the printer server 4. In addition, although the print management server 3 and the printer server 4 are shown as separate structures in the present embodiment, they may also be configured as one server.

Although the respective DBs 6, 7, and 9 through 11 are configured in an individually separated manner in the present embodiment, they may also be arranged such that one DB is configured with the keyword list DB 6 and the file hash list DB 7, and such that one DB is configured with the watermark definition file DB 9, the keyword definition file DB 10, and the hash policy file DB 11. In addition, the respective DBs may also be gathered in one place.

<Functions of the Processing Unit 2 of the Client Terminal>

Figure 2:
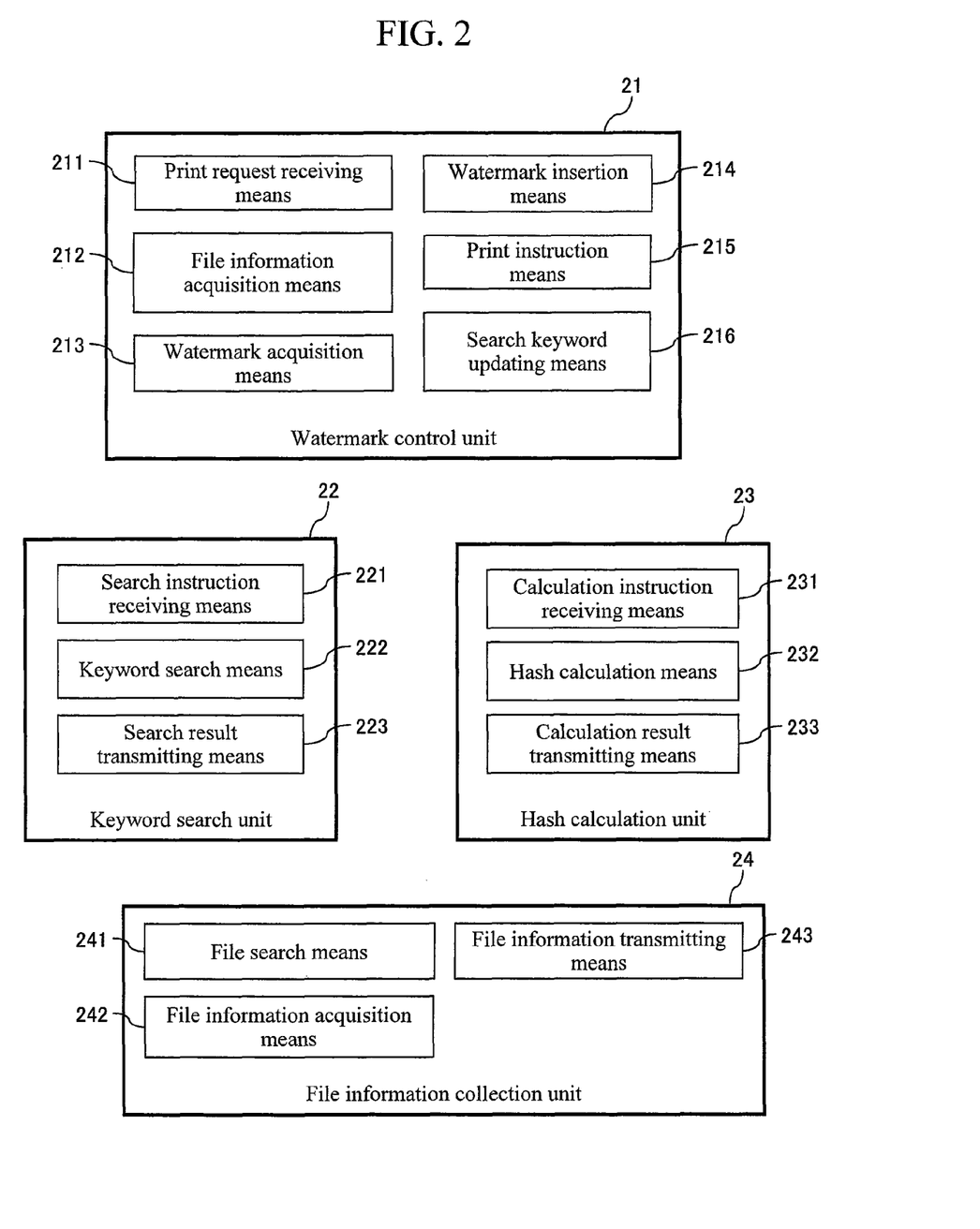
[FIG. 2] is a diagram showing a functional overview of processing units of respective client terminals forming a watermark printing management system.

FIG. 2 is a diagram showing a functional overview of the respective processing units in the processing unit 2 of the client terminal. The watermark control unit 21 comprises: print request receiving means 211 for receiving a print request (for example, the user instructs printing using such input means as a keyboard, a mouse, or the like: file specifying means) from an application on the client terminal; file information acquisition means 212 for outputting keyword search and hash calculation instructions and for acquiring information on a file to be printed (a keyword such result for the file to be printed, a hash indicating characteristics of the file to be printed, and the like); watermark acquisition means 213 for performing a watermark definition inquiry with respect to the print management server 3 based on the file information acquired through the file information acquisition means 212 and acquiring a watermark definition from the print management server 3; watermark insertion means 214 for creating watermark layout data from the watermark definition acquired through the watermark acquisition means 213 and adding it to the file; print instruction means 215 for instructing the printer 5 or 8 to print the file into which the watermark has been inserted; and search keyword updating means 216 for updating a keyword that is used in a keyword search that is performed in acquiring information on the file to be printed.

The keyword search unit 22 comprises: search instruction receiving means 221 for receiving a keyword search instruction from the file information acquisition means 212 or 242 of the watermark control unit 21 or the file information collection unit 24; keyword search means 222 for performing a keyword search within a target file using the keyword list DB 6 and based on the search instruction; and search result transmitting means 223 for transmitting the result of the keyword search within the file to the file information acquisition means 212 or 242 of the watermark control unit 21 or the file information collection unit 24.

The hash calculation unit 23 comprises: calculation instruction receiving means 231 for receiving a calculation instruction from the file information acquisition means 212 or 242 of the watermark control unit 21 or the file information collection unit 24; hash calculation means 232 for calculating a hash of the target file based on the calculation instruction; and calculation result transmitting means 233 for transmitting the calculated hash to the file information acquisition means 212 or 242 of the watermark control unit 21 or the file information collection unit 24.

The file information collection unit 24 operates, for example, periodically and when the load (CPU and memory usage) on the client terminal is light, and comprises: file search means 241 for searching for a file existing within the client terminal; file information acquisition means 242 for acquiring information on the file using the search unit 22 for executing a keyword search with respect to the file that is found through the search, the hash calculation unit 23, and the keyword list DB 6; and file information transmitting means 243 for transmitting the acquired file information to the print management server 3.

<Configuration of the Print Management Server>

Figure 3:
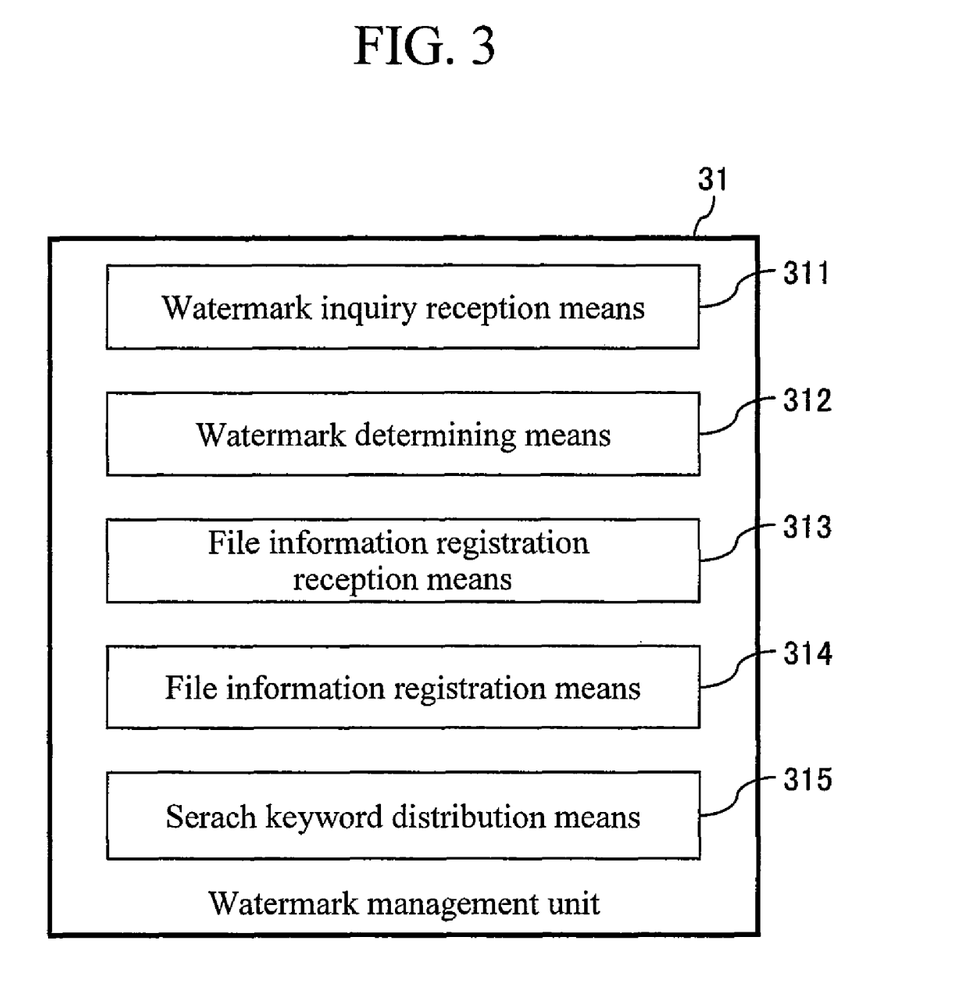
[FIG. 3] is a diagram showing a functional overview of a processing unit of a print management server forming a watermark printing management system.

FIG. 3 is a diagram showing a functional overview of the watermark management unit 31 that the print management server 3 comprises. The watermark management unit 31 comprises: watermark inquiry reception means 311 for receiving the watermark definition inquiry from the watermark control unit 21 of the client terminal; watermark determining means 312 for determining the watermark definition to be inserted based on this inquiry and transmitting it to the client terminal; file information registration reception means 313 for receiving a registration of file information from the file information collection unit 24 of the client terminal; file information registration means 314 for registering the received file information in a hash policy file; and search keyword distribution means 315 for distributing to the client terminal keywords used in keyword searches within files that are performed at the client terminal.

<Data Configuration Examples>

Figure 4A:
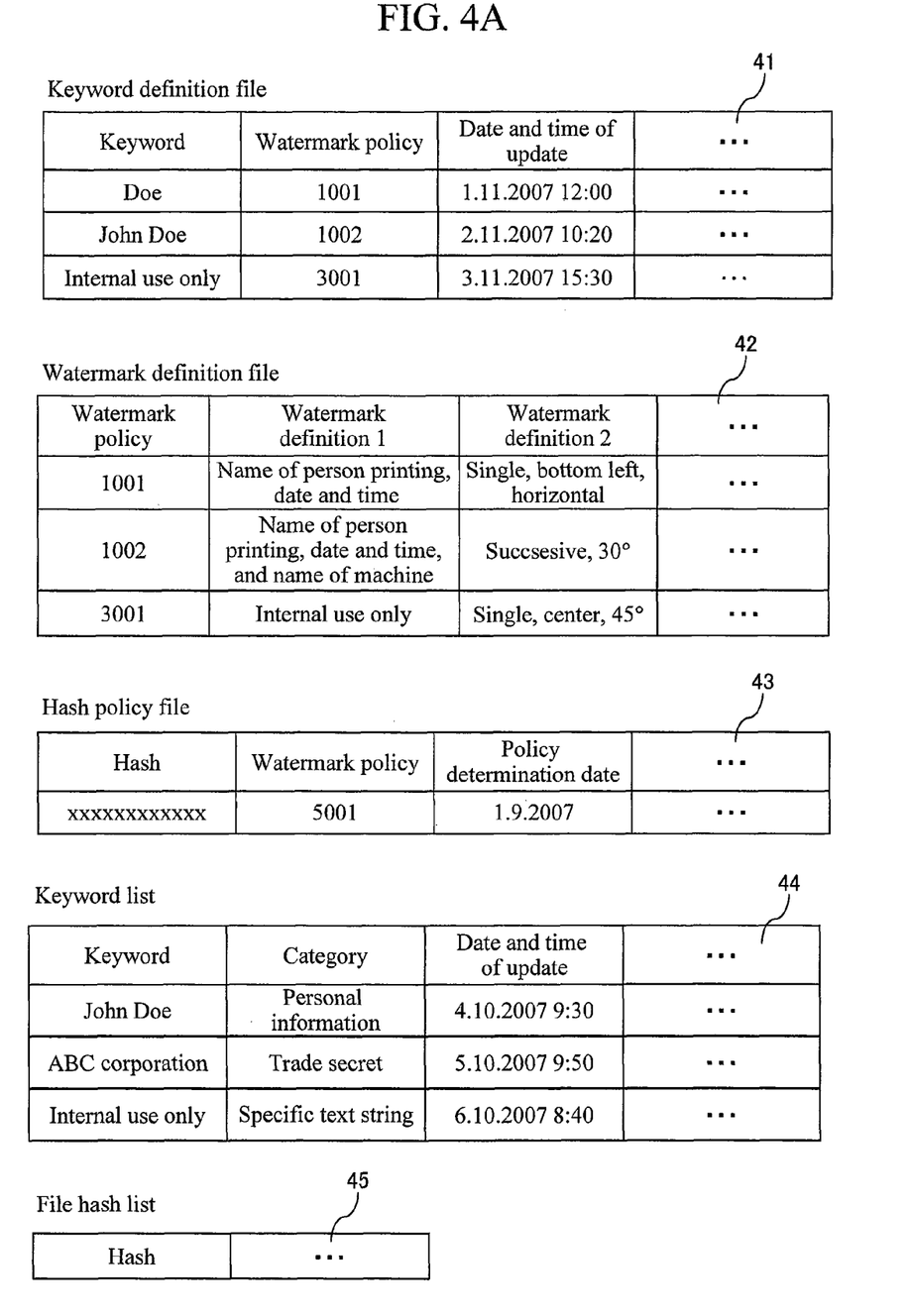
[FIG. 4A] is a data structure diagram showing structural examples of data used in a watermark printing management system.

FIG. 4A shows configuration examples of various kinds of data stored in the respective DBs within the watermark printing management system.

Keyword definition file 41 is a file that is stored in the keyword definition file DB 10, and is an electronic file comprising keywords that are searched for during keyword searches within files, watermark policies that represent the level of importance and/or level of confidentiality of the keywords, and the like. Here, for example, with respect to cases where personal information such as name and/or address and the like is found in a keyword search, the watermark policy may be changed between a case where only part of a name and/or address (such as only the family name, up to the name of the city/town/village, or the like) is found and a case where the entire name and/or address (first name and family name, everything up to city/town/village and street address) is found as shown in FIG. 4A. The same applies to other information.

Watermark definition file 42 is a file that is stored in the watermark definition file DB 9, and is an electronic file comprising definitions as to what kind of watermark is to be inserted into print material, watermark policies corresponding thereto, and the like. Watermark definitions may also be configured in several parts. In the example shown in FIG. 4A, the text string to be included in a watermark is configured as "watermark definition 1", and the arrangement method (layout) of a watermark as "watermark definition 2". In addition, the darkness, size, line spacing adjustment, and the like of the watermark text string may also be configured. Further, watermarks are so inserted as to stand out more and to allow for more detailed identification of the person who made the print, the date and time, the machine (client terminal) that made the print, and the like, the higher the level of importance and/or the level of confidentiality of the keyword and the stricter the watermark policy that is set.

Hash policy file 43 is a file that is stored in the hash policy file DB 11, and is an electronic file comprising: hashes of respective files existing on the client terminal; watermark policies corresponding to the respective files; and policy determination dates on which the policies corresponding to the respective files were determined, and the like.

The keyword definition file 41, the watermark definition file 42, and the hash policy file 43 are used upon file information acquisition and upon the updating of search keywords.

Keyword list 44 is stored in the keyword list DB 6, and is an electronic file comprising keywords that serve as search keys during keyword searches, and the like. This keyword list 44 is used at the time of file information collection. In addition, the keyword list 44 stores the same keywords as those in the keyword definition file 41. When the keyword definition file 41 is updated, their contents are synchronized by the search keyword updating means and the search keyword distribution means. There may also be provided a field for "category" in the keyword list 44, which may be used as a reference in configuring policies in the keyword definition file 41. For example, it may be arranged such that policies numbered 1xxx, 2xxx, and 3xxx are automatically assigned to keywords of the categories of personal information, trade secret, and specific text string, respectively.

File hash list 45 is stored in the file hash list DB 7, and is an electronic file comprising hashes of files that exist within the client terminal, and the like. This file hash list 45 is used at the time of file information collection.

Figure 4B:
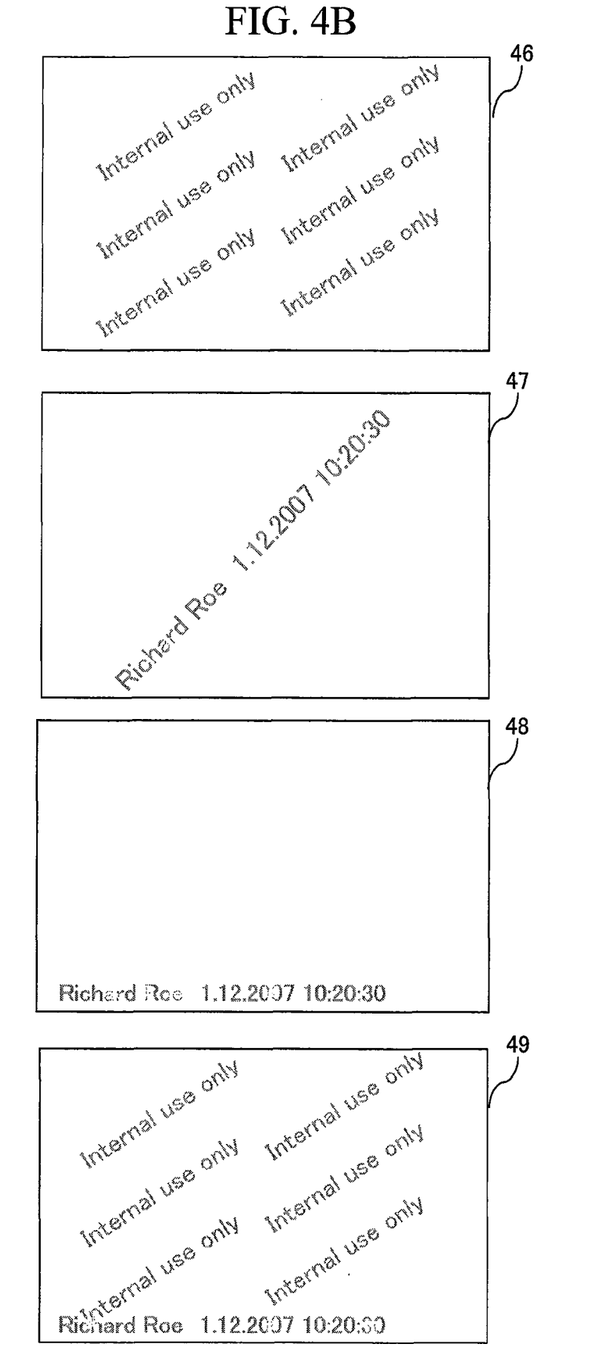
[FIG. 4B] is a diagram showing watermark layout data.

FIG. 4B shows examples of watermark layout data that are created in accordance with the configuration of the watermark definition file 42.

Watermark layout data 46 shows an example in which watermarks of the text string "Internal Use Only" are laid out in succession at an angle of 30°. Watermark layout data 47 shows an example in which a single text string of the name of the person who made the print (the user of the client terminal) and the date and time at the time of print is laid out in the center at an angle of 45°. Layout data 48 shows an example in which a single text string of the name of the person who made the print (the user of the client terminal) and the data and time at the time of print is laid out horizontally to the left at the bottom. In addition, a plurality of kinds of watermarks may be multiply laid out. Watermark layout data 49 is an example in which the watermark layout data 46 and the layout data 48 are multiply laid out.

<Process at the Time of Watermark Insertion (at the Time of Print)>

Figure 5:
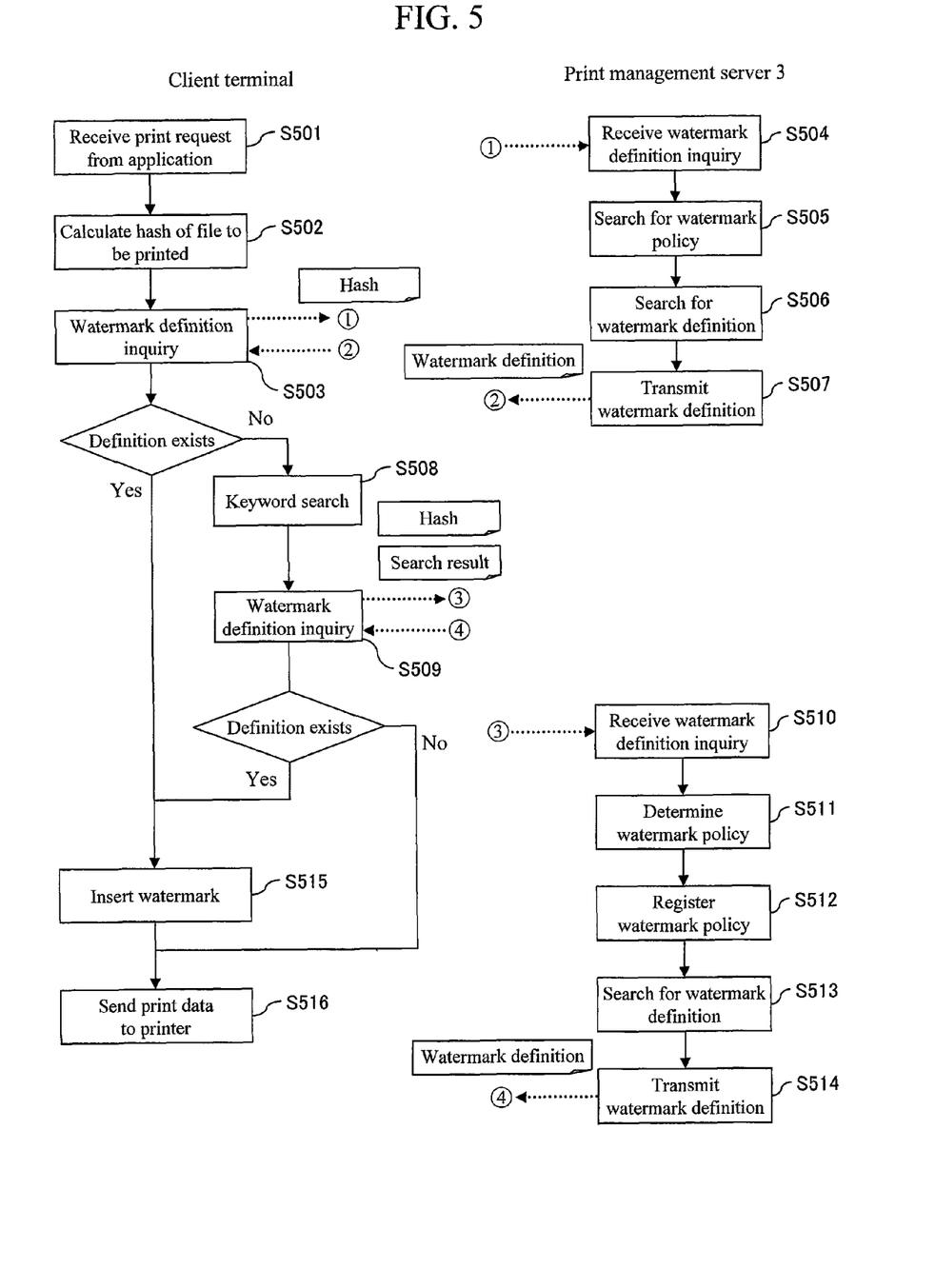
[FIG. 5] is a flowchart illustrating a process at the time of watermark insertion.

FIG. 5 is a flowchart illustrating a watermark insertion process at the time of print. As shown in FIG. 5, once the print request receiving means 221 of the watermark control unit 21 receives a print request from an application (step S501), the file information acquisition means 212 of the watermark control unit 21 instructs the hash calculation unit 23 to calculate a hash of a target file. The calculation instruction receiving means 231 receives the hash calculation instruction, and the hash calculation means 232 calculates the hash of the file (step S502). In addition, the calculation result transmitting means 233 passes the calculated hash to the file information acquisition means 212 of the watermark control unit 21. Having received the result, the watermark acquisition means 213 of the watermark control unit 21 performs a watermark definition inquiry with respect to the watermark management unit 31 of the print management server 3 with the hash as a key (step S503).

At the print management server 3, the watermark inquiry reception means 311 receives the watermark definition inquiry from the watermark acquisition means 213 (step S504). In addition, based on the received hash, the watermark determining means 312 searches the hash policy file 43 for a watermark policy corresponding to the hash (step S505). After the watermark policy search is finished, based on the watermark policy search result, the watermark determining means 312 searches the watermark definition file 42 for the corresponding watermark definition (step S506). After the watermark definition search, the watermark determining means 312 transmits the search result (the watermark definition, if one existed) to the client terminal (step S507).

The watermark control unit 21 (the watermark acquisition means 213) of the client terminal receives the watermark definition transmitted from the print management server 3 as the search result. If a watermark definition exists, based on the watermark definition, the watermark insertion means 214 inserts a watermark into the file to be printed (step S515). If a watermark definition does not exist, the keyword search means 222 executes a keyword search within the file to be printed (step S508). In addition, with the keyword search result and the hash calculated in step S502 as keys, the watermark acquisition means 213 again performs a watermark definition inquiry with respect to the print management server 3 (step S509). In so doing, if the operation is such that a different watermark is inserted for each user, the user ID of the user using the client terminal is simultaneously sent to the print management server 3. Although not shown in the drawings, name data of users in correspondence with user IDs is maintained at the print management server 3. Thus, if a watermark policy that inserts the name of the user (the person making the print) is selected in the watermark definition file 42, a different watermark depending on the user can be inserted.

The watermark definition inquiry transmitted from the client terminal is received by the watermark inquiry reception means of the watermark management unit 31 at the print management server 3 (step S510). Based on the received keyword search result, the watermark determining means 312 determines a watermark policy from the keyword definition file 41 (step S511). However, if there is a plurality of applicable watermark policies in the keyword definition file 41, the stricter watermark policy is applied. For example, if the keyword "John Doe" were found, watermark policies "1001" and "1002" in the keyword definition file 41 would be applicable in the example in FIG. 4A. However, here, the stricter watermark policy "1002" is applied. If plural watermark policies of different kinds were applicable (for example, watermark policy "1001" based on personal information and watermark policy "3001" based on a specific text string), plural watermark policies may be multiply applied. In such cases, plural kinds of watermarks are multiply inserted as shown in the watermark insertion layout data 49 in FIG. 4B, for example.

In addition, the watermark determining means 312 registers in the hash policy file DB 11 the determined policy as the hash policy file 43 together with the hash (step S512). After registration, the watermark determining means 312 searches the watermark definition file 42 for the corresponding watermark definition based on the watermark policy (step S513). In addition, the watermark determining means 312 transmits to the client terminal the watermark definition that is obtained as a search result (step S514).

At the client terminal, if a watermark definition exists at step S503, or if a watermark definition is present in the inquiry result acquired at step S509, the watermark insertion means 214 creates watermark layout data from the watermark definition, and performs watermark insertion at a predetermined position of the file to be printed (step S515).

Thereafter, the print instruction means 215 sends print data to a printer (step S516). On the other hand, if it is determined that a watermark is unnecessary, the process of step S515 is not executed, and the print instruction means 215 sends print data to the printer (step S516).

<Process at the Time of File Information Collection>

Figure 6:
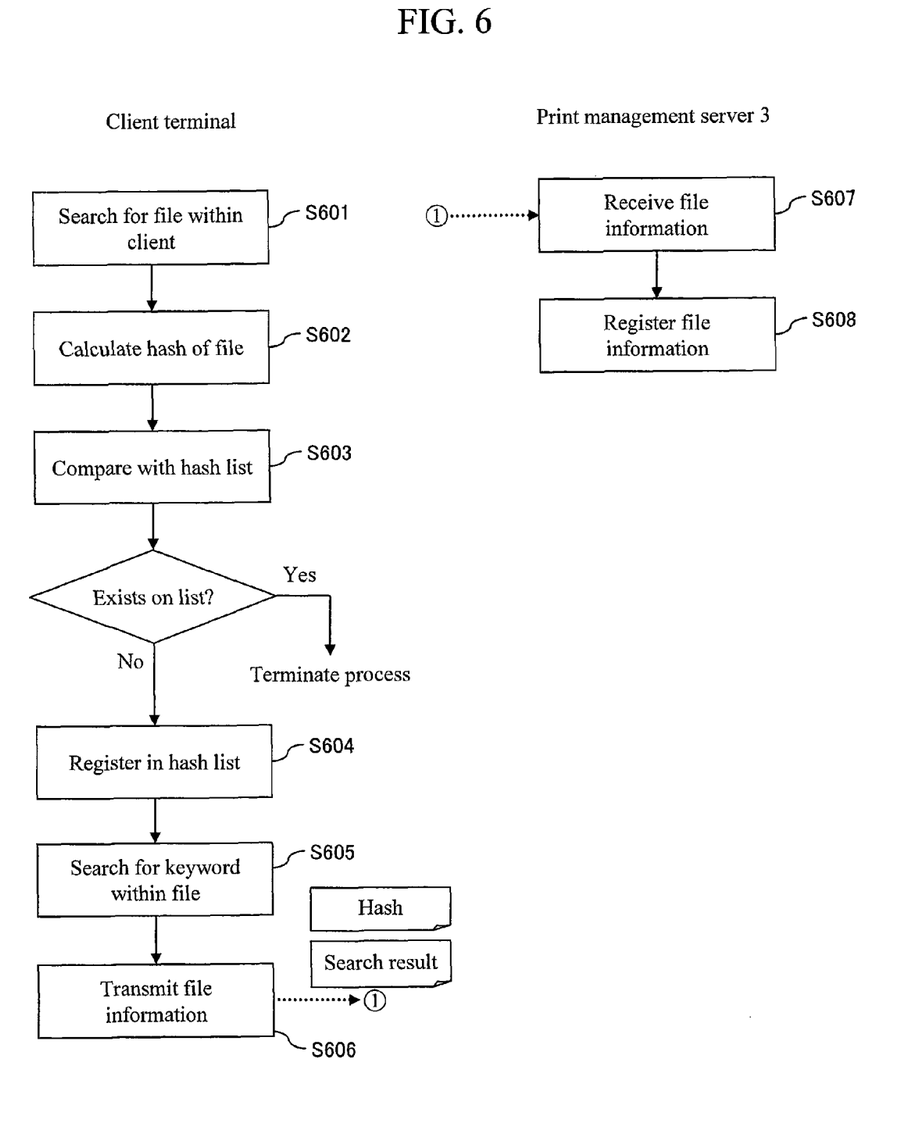
[FIG. 6] is a flowchart illustrating a process of file information collection on a client.

FIG. 6 is a flowchart illustrating a process during file information collection. In this process, file information (hashes and keywords of files) on the client terminal is periodically collected and registered in the hash policy file DB 11 of the print management server 3. Thus, it becomes possible to obviate the need to perform a keyword search within a file every time a watermark is to be inserted, and to realize high-speed execution of the watermark insertion process.

First, the file search means 241 of the file information collection unit 24 within the client terminal periodically searches for all or pre-specified files within the client terminal (step S601). Once the file search means 241 finds a file, the file information acquisition means 242 instructs the hash calculation unit 23 to calculate a hash of the file that has been found, and acquires the calculated hash (step S602). In addition, the file information acquisition means 242 compares the acquired hash with the file hash list 45 within the file hash list DB 7 of the client terminal (step S603).

If the acquired hash is exists in the file hash list 45, the file information acquisition means 242 determines that the file is a file that is already registered in the hash policy file, and the process terminates. On the other hand, if it does not exist, the file information acquisition means 242 registers the acquired hash in the file hash list 45 (step S604). Further, the file information acquisition means 242 instructs a keyword search to the keyword search unit 22, and the keyword search unit 22 executes a keyword search by comparing a keyword within the file with the keyword list 44 within the keyword list DB 6 (step S605). After the search is finished, the file information transmitting means 243 transmits to the print management server 3 the obtained keyword as a search result along with the hash (step S606).

The file information registration reception means 313 of the print management server 3 receives the search result and the hash that are transmitted from the file information transmitting means 243 of the client terminal (step S607). In addition, the file information registration means 314 registers the received search result and hash as the hash policy file 43 in the hash policy file DB 11 (step S608).

<Process at the Time of Search Keyword Update>

Figure 7:
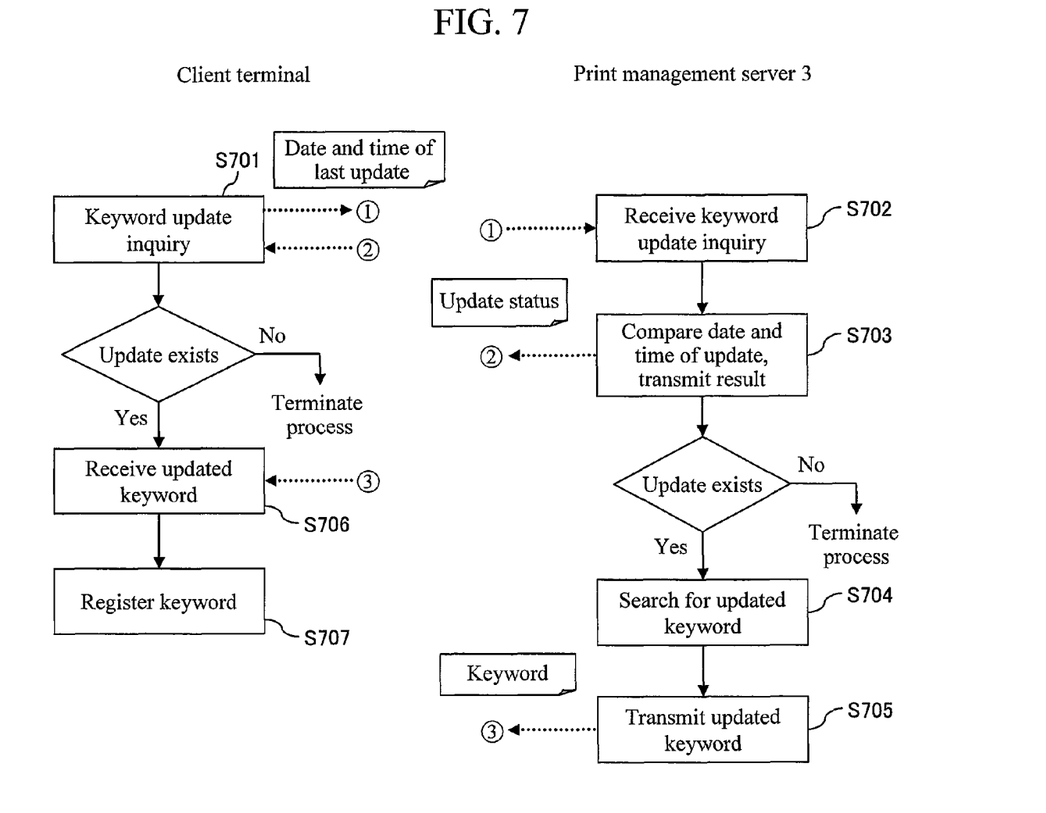
[FIG. 7] is a flowchart illustrating a process of updating a search keyword on a client.

FIG. 7 is a flowchart illustrating an updating process for search keywords used in keyword searches. This process is performed to update the keyword list 44 within the keyword list DB 6 of the client terminal. For example, at the print management server 3, a new keyword definition file 41 is sometimes added to the keyword definition file DB 10. Execution of appropriate keyword searches is enabled by reflecting the added keyword(s) in the keyword list DB 6 of the client terminal as well. The updating process for search keywords is performed periodically or at the time of a watermark insertion process. In addition, although the present embodiment is arranged such that the client terminal timely inquires the print management server 3 regarding the presence/absence of keyword updates, it is not limited as such. Naturally, an embodiment in which the print management server 3 notifies each client terminal every time keywords are updated may also be adopted.

In FIG. 7, when a search keyword update confirmation is to be performed, the search keyword updating means 216 of the watermark control unit 21 at the client terminal transmits to the watermark management unit 31 of the print management server 3 information on the date on which the current keyword list 44 was last updated (date and time of last update), and executes a keyword update inquiry (step S701). Once the keyword update inquiry is received (step S702), the watermark management unit 31 compares the received date of last update with the dates and times of last update of all keyword definition files 41 stored in the keyword definition file DB 10 (step S703).

If the last date and time of any of the keyword lists 44 is more recent than the received date and time of last update, the watermark management unit 31 determines that there has been a keyword update, and acquires from the keyword definition file 41 keywords having dates and times of update that are more recent than the received date and time of last update (step S704). If the date and time of last update are the same, it is determined that there has been no update, and the process is terminated. In both cases, the search keyword distribution means 315 replies to the client terminal with the result of the inquiry as the update status (step S703). In addition, if in the keyword definition file DB 10 there exists a keyword that has been updated, the search keyword distribution means 315 replies to the client terminal with that keyword (step S705).

If there is no update, the search keyword updating means 216 of the watermark control unit 21 at the client terminal terminates the process. If there is an update, the search keyword updating means 216 receives the keyword for keyword searches (step S705), and registers the keyword on the keyword list 44 of the keyword list DB 6 (step S706).

<Summary>

(1) In the present embodiment, a file to be printed is first specified from a file storage unit storing files, and keyword search means refers to a keyword list to search for keywords included in the file to be printed. If any of the keywords within the keyword list is included in the file to be printed, a watermark is inserted into the file to be printed. Watermark acquisition means refers to a watermark definition file and a keyword definition file that store keywords and watermarks in association with each other, compares the found keyword with the keywords in the keyword definition file, and acquires a watermark corresponding to the found keyword. In addition, printing is performed with the acquired watermark information inserted into the file to be printed. Thus, a file containing an important keyword can be printed with a watermark that is commensurate with its level of importance (level of confidentiality) inserted thereinto. In addition, since watermarks can be varied in accordance with the level of importance by simply associating keywords with watermarks, complicated operations such as those of Patent Document 2 become unnecessary.

In addition, hash calculation means calculates a hash of the file to be printed, and the watermark acquisition means refers to a hash policy file and the watermark definition file that store hashes of files and watermarks in association and acquires a watermark corresponding to the calculated hash. In addition, printing is performed with the acquired watermark inserted into the file to be printed. Thus, a watermark that is commensurate with the level of importance of the file can be acquired by simply associating file-specific hashes with watermarks. More efficient processing can be expected when a watermark is acquired in accordance with a hash than as compared to when a watermark is acquired in accordance with a keyword. This is because hash calculations require shorter processing time than keyword searches. As for files for which a hash is not registered, a watermark acquisition process via the keyword search described above may be executed.

In addition, it may also be arranged such that the hash calculation means calculates a hash of the file to be printed, and the file information registration means acquires from the keyword definition file a watermark policy corresponding to the found keyword, associates the acquired watermark policy with the calculated hash, and registers them in the hash policy file. Thus, with respect to a file that is the same as the file that was to be printed this time, a watermark can be acquired from a hash from next time, and an improvement in processing efficiency can therefore be achieved.

In addition, if a file stored in the file storage means is updated or if a file is newly added, the hash calculation means calculates a hash of the updated file or the added file to acquire a new hash. In addition, the keyword search means searches for a keyword included in the updated file or the added file as a link keyword (the keyword obtained as a search result of step S606, FIG. 6). The file information registration means acquires a watermark policy corresponding to the link keyword from the keyword definition file, associates the acquired watermark policy with the new hash, and registers them in the hash policy file. This series of steps is executed, for example, periodically. Thus, even if a file is updated or a file is newly added, it becomes possible to acquire a watermark from a hash, thereby achieving an improvement in processing efficiency.

Further, if a keyword of the keyword definition file is updated, keyword updating means reflects the content of this update in the keyword list. In the present embodiment, the keyword list is updated by way of an inquiry from the client terminal to the print management server. However, it may also be arranged such that if there is a keyword update from the print management server, the update content is automatically reflected in the keyword list. Thus, for example, even if important keywords were to increase, the increased keywords would be appropriately reflected in the keyword list of the client, thereby dramatically reducing the load with respect to maintenance of the printing management system.

(2) The present invention may also be realized by means of a program code of software that realizes the functions of the embodiment. In this case, a storage medium that records the program code is provided to a system or device, and a computer (or a CPU or MPU) of that system or device reads the program code stored on the storage medium. In this case, the program code itself that is read from the storage medium would realize the functions of the embodiment described above, and the program code itself as well as the storage medium storing it would constitute the present invention. As storage media for supplying such a program code, floppy (registered trademark) disks, CD-ROMs, DVD-ROMs, hard disks, optical disks, magneto-optical disks, CD-Rs, magnetic tapes, non-volatile memory cards, ROM and the like may be used, for example.

In addition, based on instructions of the program code, the OS (operating system) and the like running on the computer may perform part or all of the actual process, and realize the functions of the embodiment described above through such a process. Further, after the program code read from the storage medium is written to the memory on the computer, based on instructions of that program code, the CPU and the like of the computer may perform part or all of the actual process, and realize the functions of the embodiment described above through such a process.

In addition, by distributing via a network a program code of software that realizes functions of the embodiment, it may be stored on storage means such as a hard disk, memory, or the like of a system or a device, or on a storage medium such as CD-RW, CD-R, or the like. Upon use, a computer (or a CPU or MPU) of that system or device may read and execute the program code stored on the storage means or storage medium.

The invention claimed is:

1. A printing management system for inserting watermark information into a file and printing the file, comprising:
   means which specifies a file to be printed from file storage means for storing a file;
   keyword storage means which stores a keyword which is a keyword that, if included in the file to be printed, signifies that watermark information is to be inserted into the file to be printed;
   watermark information storage means which stores the keyword and the watermark information in association;
   keyword search means which searches for the keyword included in the file to be printed by referring to the keyword storage means;
   watermark information acquisition means which acquires watermark information corresponding to the found keyword by comparing the found keyword with the keyword stored in the watermark information storage means;
   watermark insertion means which inserts the acquired watermark information into the file to be printed;
   printing means which prints the file to be printed into which the watermark information is inserted;
   hash calculation means; and
   file information registration means, wherein
   the watermark information storage means includes a keyword definition file that stores a watermark policy, which indicates the level of importance of the keyword, and the keyword in association, and a watermark definition file that stores the watermark policy and the watermark information in association,
   the watermark information acquisition means acquires the watermark policy corresponding to the found keyword, and acquires the watermark information corresponding to the acquired watermark policy,
   the hash calculation means calculates a hash of the file to be printed, and
   the file information registration means acquires from the keyword definition file the watermark policy corresponding to the found keyword, and registers in a hash policy file the acquired watermark policy and the calculated hash in association.

2. The printing management system according to claim 1, wherein
   when a file stored in the file storage means is updated or when a file is newly added, the hash calculation means calculates a hash of the updated file or the added file to acquire a new hash,
   the keyword search means searches for the keyword included in the updated file or the added file as a link keyword, and
   the file information registration means acquires from the keyword definition file the watermark policy corresponding to the link keyword, and registers in the hash policy file the acquired watermark policy and the new hash in association.

3. The printing management system according to claim 2, further comprising keyword updating means which, when the keyword of the watermark information storage means is updated, reflects the content of this update in the keyword storage means.

4. The printing management system according to claim 1, further comprising keyword updating means which, when the keyword of the watermark information storage means is updated, reflects the content of this update in the keyword storage means.

5. A program for causing a computer to function as the printing management system according to claim 1.

6. A printing management system for inserting watermark information into a file and printing the file, comprising:
   means which specifies a file to be printed from file storage means for storing a file;
   hash calculation means which calculates a hash of the file to be printed;
   watermark information storage means which stores a hash of a file and watermark information in association;
   watermark information acquisition means which acquires watermark information corresponding to the calculated hash by comparing the calculated hash with the hash stored in the watermark information storage means;
   watermark information insertion means which inserts the acquired watermark information into the file to be printed; and
   printing means which prints the file to be printed into which the watermark information is inserted.

7. The printing management system according to claim 6, further comprising:

keyword storage means which stores a keyword which is a keyword that, if included in the file to be printed, signifies that watermark information is to be inserted into the file to be printed; and keyword search means which searches for the keyword included in the file to be printed by referring to the keyword storage means, wherein the watermark information storage means further stores the keyword stored in the keyword storage means and the watermark information in association, and the watermark information acquisition means, if unable to acquire the watermark information corresponding to the calculated hash, acquires watermark information corresponding to the found keyword by comparing the found keyword with the keyword stored in the watermark information storage means.

8. A program for causing a computer to function as the printing management system according to claim 6.

9. A printing management method for inserting watermark information into a file and printing the file, comprising the steps of:

specifying, by file specifying means, a file to be printed from file storage means for storing a file;

referring, by keyword search means, to keyword storage means for storing a keyword which is a keyword that, if included in the file to be printed, signifies that watermark information is to be inserted into the file to be printed, and searching for the keyword included in the file to be printed;

referring, by watermark information acquisition means, to watermark information storage means for storing the keyword and the watermark information in association, and comparing the found keyword and the keyword stored in the watermark information storage means to acquire watermark information corresponding to the found keyword;

inserting, by watermark insertion means, the acquired watermark information into the file to be printed; and, printing, by printing means, the file to be printed into which the watermark information is inserted, wherein the watermark information storage means includes a keyword definition file for storing a watermark policy, which indicates the level of importance of the keyword, and the keyword in association, and a watermark definition file for storing the watermark policy and the watermark information in association, and wherein the watermark information acquisition means acquires the watermark policy corresponding to the found keyword, and acquires the watermark information corresponding to the acquired watermark policy, the printing management method further comprising the steps of:

calculating, by hash calculation means, a hash of the file to be printed; and, acquiring, by file information registration means, from the keyword definition file the watermark policy corresponding to the found keyword, and registering in a hash policy file the acquired watermark policy and the calculated hash in association.

10. The printing management method according to claim 9, wherein when a file stored in the file storage means is updated or when a file is newly added, the hash calculation means calculates a hash of the updated file or the added file to acquire a new hash, the keyword search means searches for the keyword included in the updated file or the added file as a link keyword, and the file information registration means acquires from the keyword definition file the watermark policy corresponding to the link keyword, and registers in the hash policy file the acquired watermark policy and the new hash in association.

11. The printing management method according to claim 10, further comprising the step of, when the keyword of the watermark information storage means is updated, reflecting, by keyword updating means, the content of this update in the keyword storage means.

12. The printing management method according to claim 9, further comprising the step of, when the keyword of the watermark information storage means is updated, reflecting, by keyword updating means, the content of this update in the keyword storage means.

13. A printing management method for inserting a watermark information into a file and printing the file, comprising the steps of:

specifying, by file specifying means, a file to be printed from file storage means for storing a file;

calculating, by hash calculation means, a hash of the file to be printed, referring, by watermark information acquisition means, to watermark information storage means for storing a hash of a file and watermark information in association, comparing the calculated hash with a hash stored in the watermark information storage means, and acquiring watermark information corresponding to the calculated hash;

inserting, by watermark insertion means, the acquired watermark information into the file to be printed; and, printing, by printing means, the file to be printed into which the watermark information is inserted.

14. The printing management method according to claim 13, further comprising the step of referring, by keyword search means, to keyword storage means for storing a keyword which is a keyword that, if included in the file to be printed, signifies that watermark information is to be inserted into the file to be printed, and searching for the keyword included in the file to be printed, wherein the watermark information storage means further stores the keyword stored in the keyword storage means and the watermark information in association, and wherein the watermark information acquisition means, if unable to acquire the watermark information corresponding to the calculated hash, compares the found keyword with the keyword stored in the watermark information storage means, and acquires watermark information corresponding to the found keyword.

* * * * *